March 3, 1931.  C. B. SCHNEIBLE  1,794,986

VAPOR LIQUID COLUMN

Original Filed April 5, 1926  2 Sheets-Sheet 1

Inventor:
Claude B. Schneible,
By Dyrenforth, Lee, Chritton & Wiles,
Attys.

March 3, 1931.    C. B. SCHNEIBLE    1,794,986
VAPOR LIQUID COLUMN
Original Filed April 5, 1926    2 Sheets-Sheet 2
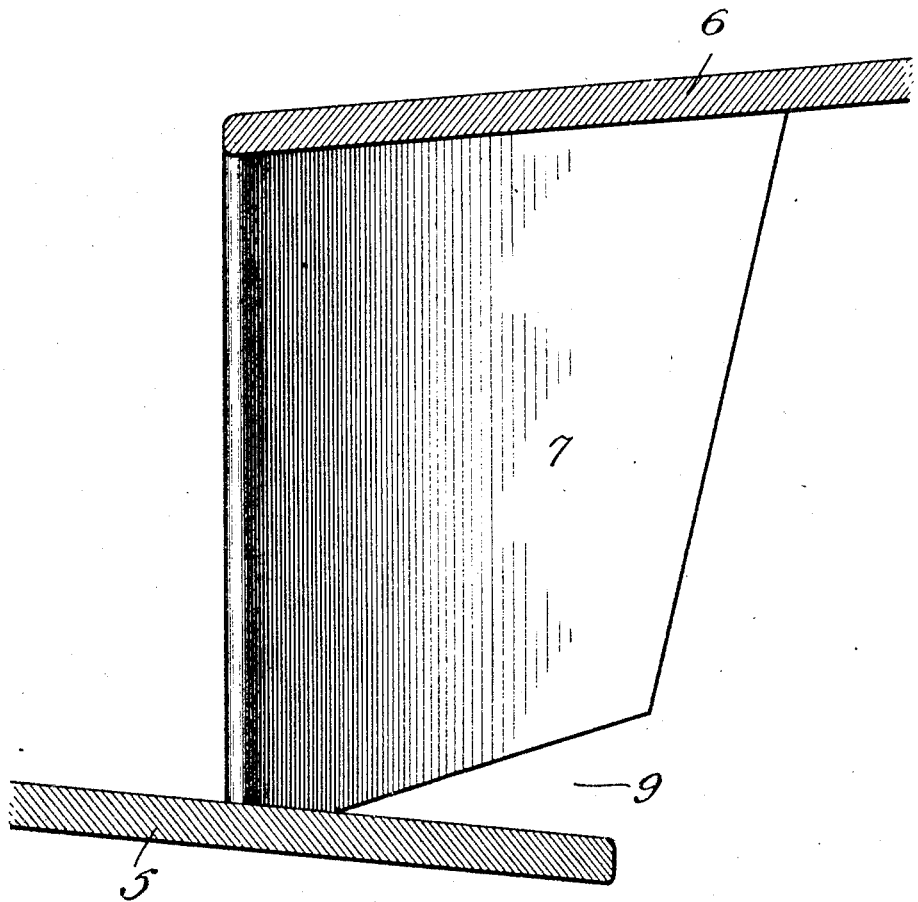

Patented Mar. 3, 1931

1,794,986

UNITED STATES PATENT OFFICE

CLAUDE B. SCHNEIBLE, OF EVANSTON, ILLINOIS, ASSIGNOR TO CLAUDE B. SCHNEIBLE, K. F. SCHREIER, AND BENJAMIN B. SCHNEIDER, AS TRUSTEES UNDER THE NAME OF THE JOSEPH SCHNEIBLE TRUST

VAPOR-LIQUID COLUMN

Application filed April 5, 1926, Serial No. 99,818. Renewed January 8, 1931.

This invention relates to improvements in vapor-liquid columns, such as are used as distilling columns, dephlegmating towers, scrubbing towers, absorption towers and other columns in which descending liquids are subjected to prolonged intimate treatment with ascending vapors.

In U. S. Patent No. 1,366,956, issued February 1, 1921, there is described a column in which a sequence of baffle plates alternately of the plate and baffle-ring type and downwardly pitched to prevent the accumulation of liquid, are provided, curved vanes being provided between the plates and the baffle-rings therebeneath, said vanes lying in a general direction substantially inclined to the radial direction, for the purpose of imparting a circular or whirling motion to the ascending vapors whereby intimate contact and interaction between the descending liquid and the ascending vapors are obtained. In this column the descending liquid passing over the baffle-rings tends to build up against the sides of the vanes.

According to the present invention such building up is avoided and the descending liquid passes from the baffle-rings to the plates therebelow in a uniform manner, whereby more perfect contact and interaction between the vapors and liquid are obtained and the pressure differential in the column is reduced.

The invention will be readily understood from the following description of a preferred embodiment which is illustrated in the accompanying drawing, in which:

Fig. 3 is an enlarged fragmentary sectional view on the line 3—3, Fig. 1.

Figure 1:
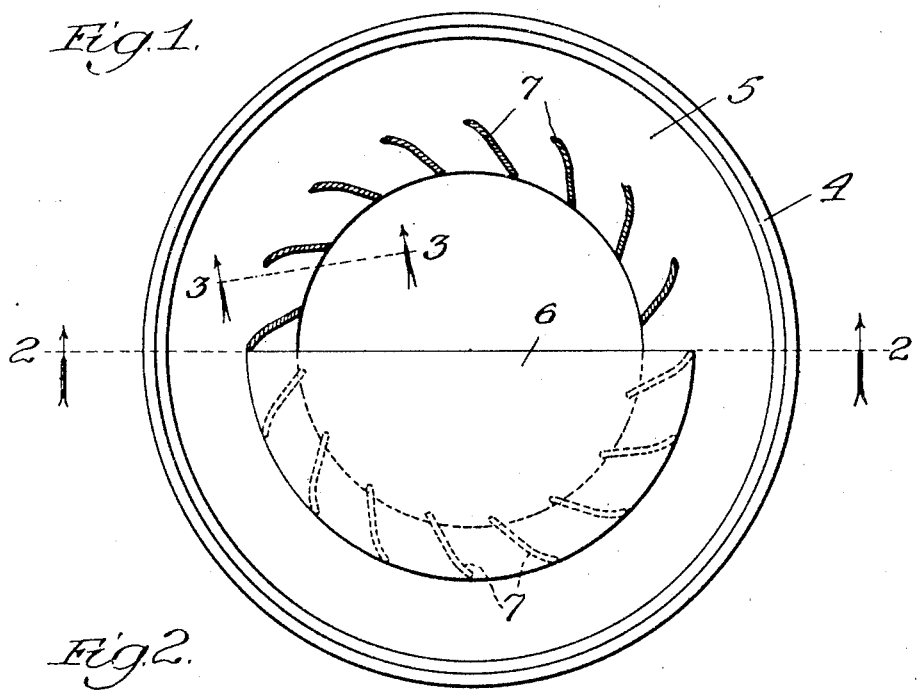
Figure 1 is a horizontal section, taken on the line 1—1 of Fig. 2, of a column constructed according to the invention.
Figure 2:
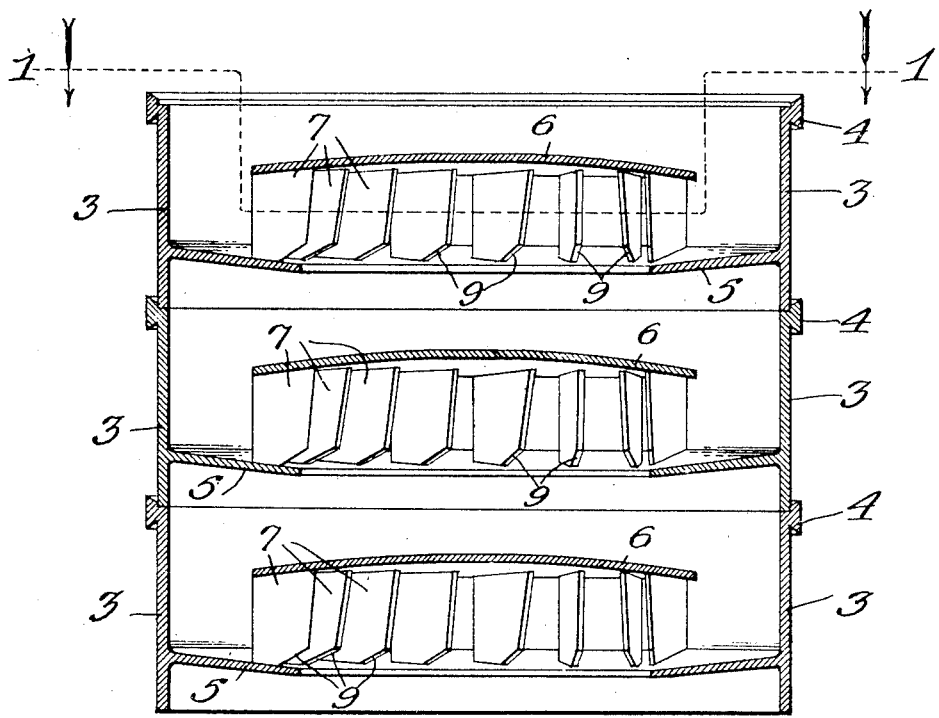
Fig. 2 is a section taken on line 2—2 of Fig. 1, of a portion of such a column.

The column is preferably built of, or comprises a series of annular cylindrical sections 3, shown to be all alike, each having a flange 4 formed about its upper end and extending above the latter to adapt each succeeding section to seat fittingly at its lower end against the upper end of the preceding section and be bracingly encircled by the upwardly projecting portion of the annular flange. These sections may be securely tied together in their column-forming relation by any suitable means. A baffle-ring 5 extends inwardly from the wall of each section 4 and inclines downwardly toward the center thereof. A concavo-convex deflector plate 6 has depending from it at uniform intervals, and formed integral therewith, a circular series of curved guide-vanes 7 bearing at their lower ends against and there conforming to the inclination of the baffle-ring 5. The vanes may be welded to the baffle-plates or otherwise suitably attached thereto. The vanes 7 have a general direction inclined to the radial direction for the purpose of imparting a whirling or circular motion to the vapors passing therebetween. The vanes 7 are cut away at their lower ends, particularly at the inner periphery of the baffle-ring as shown at 9, whereby the liquid is permitted to distribute itself substantially uniformly over the inner portion of the baffle-ring before it passes from the edge thereof. At the same time the effect of the vanes 7, in imparting a circular or whirling motion to the vapors is unchanged.

It is to be understood that the foregoing example is not to be considered limitative, but merely illustrative, of the present invention since it is obvious that many modifications can readily be evolved embodying the same inventive idea of imparting a circular or whirling motion to the ascending vapors while avoiding building up of the liquid or rendering its flow ununiform. I therefore intend to be protected for the invention broadly within the scope of the appended claims.

I claim:

1. A vapor-liquid column, comprising a series of alternating ring plates and deflector plates in spaced relation, vanes extending from deflector plates into proximity with the plates therebeneath, said vanes being inclined to the radial direction whereby the ascending vapors are given a whirling motion and the liquid is permitted to distribute itself uniformly over the lower plates.

2. In a vapor-liquid column, a ring plate and a disk plate in superimposed relation, vanes extending vertically therebetween and resting on the lower plate, said vanes being inclined to the radial direction and being cut away at their lower edges adjacent the edge of the lower plate.

3. A vapor-liquid column section, comprising an outer wall, a baffle-ring extending inwardly therefrom, a deflector plate above and in spaced relationship to said baffle-ring, vertical vanes extending from said deflector plate to said baffle-ring, said vanes being inclined to the radial direction and being cut away at their lower inner ends to permit distribution of the liquid over the inner periphery of the baffle-ring before passing therefrom.

4. In a vapor-liquid column, a ring plate and a disk plate in superimposed relation, vertical vanes extending substantially completely from plate to plate, said vanes being inclined to the radial direction and being cut away at their lower ends adjacent the edge of the lower plate.

5. In a vapor-liquid column, a ring plate inclined downwardly towards the center and a disk plate in superimposed relation, vanes extending vertically therebetween, said vanes being inclined to the radial direction and being adapted to contact with the lower plate along a small portion of their lower edges, the remainder of said edges being spaced apart from the lower plate sufficiently to permit the descending liquid to spread thereover.

6. In the vapor-liquid column, a baffle-ring inclined downwardly towards the center, a baffle-disk provided integrally with vertical vanes on its underside, said vanes being inclined to the radial direction and adapted to contact with the baffle-ring along a small portion of their lower edges, the remainder of said edges being spaced apart from said ring sufficiently to permit descending liquid to spread thereover.

In testimony whereof I hereunto set my hand this 2nd day of April, 1926.

CLAUDE B. SCHNEIBLE.